(12) United States Patent
Ballman (10) Patent No.: US 12,246,334 B2
(45) Date of Patent: Mar. 11, 2025

(54) ROOF COATING SPRAYER AND METHODS FOR ROOF COATING

(71) Applicant: Mark Ballman, Kasota, MN (US)

(72) Inventor: Mark Ballman, Kasota, MN (US)

( * ) Notice: Subject to any disclaimer, the term of this patent is extended or adjusted under 35 U.S.C. 154(b) by 191 days.

(21) Appl. No.: 17/737,010

(22) Filed: May 4, 2022

(65) Prior Publication Data

US 2022/0355325 A1 Nov. 10, 2022

Related U.S. Application Data

(60) Provisional application No. 63/304,751, filed on Jan. 31, 2022, provisional application No. 63/183,813, filed on May 4, 2021.

(51) Int. Cl.

| *B05B 13/00* | (2006.01) |
| *B05B 1/20* | (2006.01) |
| *B05B 15/68* | (2018.01) |
| *B60K 1/00* | (2006.01) |
| *B60K 17/04* | (2006.01) |
| *B60L 15/20* | (2006.01) |
| *E04D 15/07* | (2006.01) |

(Continued)

(52) U.S. Cl.
CPC ............ *B05B 13/005* (2013.01); *B05B 1/202* (2013.01); *B05B 15/68* (2018.02); *B60K 1/00* (2013.01); *B60K 17/04* (2013.01); *B60L 15/20* (2013.01); *E04D 15/07* (2013.01); *F16H 7/06* (2013.01); *E04D 7/00* (2013.01)

(58) Field of Classification Search
USPC ......... 118/313, 315, 305, 323, 679–681, 686
See application file for complete search history.

(56) References Cited

U.S. PATENT DOCUMENTS

| 4,252,274 A | * | 2/1981 | Kubacak | ................. E01H 11/00 |
| | | | | 239/176 |
| 4,669,662 A | * | 6/1987 | Bruce | ................. A01M 7/0035 |
| | | | | 239/164 |
| 10,618,179 B1 | * | 4/2020 | See | .......................... B25J 19/04 |

(Continued)

FOREIGN PATENT DOCUMENTS

| CA | 2806685 A1 | * | 8/2013 | ........... B05B 13/005 |
| JP | H08154558 A | * | 6/1996 | |
| JP | 2004173624 A | * | 6/2004 | |

OTHER PUBLICATIONS

English Translation JP2004173624 (Year: 2004).*

(Continued)

*Primary Examiner* — Yewebdar T Tadesse
(74) *Attorney, Agent, or Firm* — Bradley J. Thorson; DeWitt LLP (57) ABSTRACT

A roof coating sprayer including a cart assembly and a sprayer assembly. The cart assembly has a frame with a plurality of wheels. The frame has a sprayer support assembly with a lateral member, and vertical spray nozzle attachment members arranged along the lateral member. The attachment members each mount a spray nozzle and can be vertically and horizontally shifted relative to the lateral member. The roof coating sprayer can be pulled over the surface of a roof at a uniform rate, enabling a coating of a uniform thickness to be sprayed on the roof. Additionally, the cart assembly can be self-propelled, enabling a uniform rate of speed for the cart and thereby enabling uniform application of coating.

10 Claims, 10 Drawing Sheets

(51) Int. Cl.
*F16H 7/06* (2006.01)
*E04D 7/00* (2006.01)

(56) References Cited

U.S. PATENT DOCUMENTS

2013/0008716 A1* 1/2013 Kuittinen .................. B60L 7/22
 175/57
2020/0232222 A1* 7/2020 Shetler .................... B05B 15/60

OTHER PUBLICATIONS

English Translation JPH08154558 (Year: 1996).*
Automated Spray Foam Machines SprayWorks, Spray Works Equipment Group LLC YouTube Video https://www.youtube.com/watch?v=Pz4bNdxqXLM (Year: 2018).*

* cited by examiner

ID SPRAYER AND METHODS
ROOF COATING SPRAYER AND METHODS FOR ROOF COATING

RELATED APPLICATION

The present application claims the benefit of U.S. Provisional Application No. 63/183,813 filed May 4, 2021, and U.S. Provisional Application No. 63/304,751 filed Jan. 31, 2022, both said applications being hereby incorporated herein in their entireties by reference.

TECHNICAL FIELD

The present application relates to apparatuses and methods for applying roof coatings, and more specifically, apparatuses and methods for spraying-on roof coatings.

BACKGROUND

Metal roofs are a common type of roof construction, particularly for commercial and industrial buildings. Typically, a coating is applied on top of the metal sheeting to provide improved leak resistance, corrosion protection, and solar heat rejection. Such coatings can be acrylic, silicone, polyurethane, synthetic rubber, or epoxy material, and depending on the type of coating can range from about 20 to 80 mils in thickness. Generally, the coating is applied manually with a sprayer wand connected to a pressurized liquid source, or is rolled on with a nap roller.

A drawback of coating application with a sprayer wand or roller is that coating thickness can be uneven. In particular, the coating at the edges of a roof and at the edges of a spray field can be thinner as a result of the technician avoiding spraying too close to the edge. For the roof edge, this might result in "drift," whereby the coating spray falls onto siding, windows, landscaping, or vehicles parked below. Unevenness in the coating thickness can cause premature failure of the coating and void warranties on the coating or roof.

Coating apparatuses are known in which spray nozzles are affixed to a cart, and the cart is pulled across the roof to apply a coating. One example of such a cart is disclosed in U.S. Application No. 2005/0191433A1. A drawback of such prior art carts, however, is that it is still difficult to achieve a uniform rate of progress across the roof, and therefore the uniformity of coating suffers. Also, due to the configuration of the cart with the spray nozzles positioned on one side of the cart, the width of coating that can be applied in one pass is limited.

What are needed in the industry is apparatuses and methods for applying roof coatings that address the shortcomings of the prior art.

SUMMARY

Embodiments of the present invention address the need in the industry for apparatuses and methods for applying roof coatings that address the shortcomings of the prior art.

According to embodiments of the invention, a roof coating sprayer includes a cart assembly and a sprayer assembly. The cart assembly has a frame with a plurality of wheels. The frame has a sprayer support assembly with a lateral member, and vertical spray nozzle attachment members arranged along the lateral member. The attachment members each mount a spray nozzle and can be vertically and horizontally shifted relative to the lateral member. The roof coating sprayer can be pulled over the surface of a roof at a uniform rate, enabling a coating of a uniform thickness to be sprayed on the roof. Additionally, the cart assembly can be self-propelled, enabling a uniform rate of speed for the cart and thereby enabling uniform application of coating.

In an embodiment, a sprayer for applying a coating to a planar surface includes a frame, a plurality of wheels operably coupled to the frame, a drive assembly operably coupled to at least one of the plurality of wheels, with the drive assembly including a motor and a transmission operably coupling the motor and the at least one of the plurality of wheels. The sprayer further includes a sprayer assembly operably coupled to the frame, the sprayer assembly including a supply hose adapted to couple with a pressurized supply of liquid coating material, a plurality of spray nozzles adapted to spray the liquid coating material on the planar surface, a manifold coupled with the supply hose, and a plurality of spray nozzle hoses fluidly coupled with the manifold. Each of the plurality of spray nozzle hoses is fluidly coupled with a separate one of the plurality of spray nozzles to deliver the liquid coating material to the respective separate one of the plurality of spray nozzles.

In embodiments, the drive motor of the drive assembly can be a direct current electric motor. The transmission can include a drive sprocket coupled with an output shaft of the motor and a driven sprocket coupled with an axle, the axle being coupled with the at least one of the plurality of wheels, the drive sprocket and the driven sprocket being coupled by a chain.

In further embodiments, the transmission can include a drive sprocket coupled with an output shaft of the motor, a driven sprocket coupled with an intermediate shaft having a secondary drive sprocket, and the axle having a secondary driven sprocket coupled with the at least one of the plurality of wheels, the drive sprocket of the output shaft of the motor and the driven sprocket of the intermediate shaft being coupled by a first chain, and the secondary drive sprocket and the driven sprocket of the axle being coupled by a second chain.

In embodiments, the drive assembly can include a motor controller. The motor controller can include a switch electrically coupled to enable selection of a direction of rotation for the motor, a speed selection control enabling a user to adjust a rotation speed of the motor, and a display enabling a user to view the relative rotation speed of the motor.

In embodiments, the manifold can include a plurality of operable valves, each of the operable valves coupled to a separate one of the plurality of spray nozzle hoses and arranged so as to control the flow of liquid coating material to the respective one of the plurality of spray nozzle hoses.

In further embodiments, the sprayer can include a sprayer support assembly operably coupled to the cart, the sprayer support assembly including a boom, and a plurality of vertical spray nozzle attachment members operably coupled to the boom, each one of the plurality of spray nozzles being attached to a separate one of the vertical spray nozzle attachment members. Each one of the plurality of vertical spray nozzle attachment members can be selectively vertically shiftable relative to the boom. Each one of the plurality of vertical spray nozzle attachment members can be selectively horizontally shiftable relative to the boom.

In still further embodiments, the sprayer support assembly can include a wind skirt.

In embodiments, a method of applying a coating to a planar surface includes providing a sprayer comprising a frame, a plurality of wheels operably coupled to the frame, a drive assembly operably coupled to at least one of the plurality of wheels, wherein the drive assembly includes a motor and a transmission operably coupling the motor and the at least one of the plurality of wheels, and a sprayer assembly operably coupled to the frame, wherein the sprayer assembly includes a supply hose adapted to couple with a pressurized supply of liquid coating material, a plurality of spray nozzles adapted to spray the liquid coating material on the planar surface, a manifold coupled with the supply hose, and a plurality of spray nozzle hoses fluidly coupled with the manifold, each of the plurality of spray nozzle hoses fluidly coupled with a separate one of the plurality of spray nozzles to deliver the liquid coating material to the respective separate one of the plurality of spray nozzles. The method further includes coupling the supply hose to the pressurized supply of liquid coating material, and actuating the drive assembly to move the sprayer across the planar surface, the plurality of spray nozzles acting to spray the liquid coating material on the planar surface.

In embodiments of the method, the manifold can include a plurality of operable valves, each of the operable valves coupled to a separate one of the plurality of spray nozzle hoses and arranged so as to control the flow of liquid coating material to the respective one of the plurality of spray nozzle hoses, and the method can include opening at least one of the valves to enable spraying of the liquid coating material.

In embodiments, the method can include adjusting a relative position of at least one of the plurality of spray nozzles. The sprayer can include a sprayer support assembly operably coupled to the cart, the sprayer support assembly including a boom, and a plurality of vertical spray nozzle attachment members operably coupled to the boom, each one of the plurality of spray nozzles being attached to a separate one of the vertical spray nozzle attachment members, each of the vertical spray nozzle attachment members being selectively vertically shiftable relative to the boom, and the method can include shifting a vertical position of at least one of the vertical spray nozzle attachment members relative to the boom.

In embodiments, the sprayer can include a sprayer support assembly operably coupled to the cart, the sprayer support assembly including a boom, and a plurality of vertical spray nozzle attachment members operably coupled to the boom, each one of the plurality of spray nozzles being attached to a separate one of the vertical spray nozzle attachment members, each of the vertical spray nozzle attachment members being selectively horizontally shiftable relative to the boom. The method can include shifting a horizontal position of at least one of the vertical spray nozzle attachment members relative to the boom.

In embodiments, the drive assembly further comprises a motor controller having a speed selection control enabling a user to adjust a rotation speed of the motor, and the method can include adjusting a rate of progress of the sprayer using the speed selection control.

Also, the sprayer can include a sprayer support assembly, and the method can include affixing a wind skirt to the sprayer support assembly.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

There is depicted in FIGS. 1-12 roof coating sprayer 20 according to embodiments of the invention. Sprayer 20 generally includes cart assembly 22 and sprayer assembly 24. Cart assembly 22 generally includes body plates 26, 28, side wheel struts 30, 32, strut brace 34, rear wheel strut 36, handle member 38, sprayer support assembly 40, and lateral member 42. Cart assembly 22 rolls on side wheels 44, 46, which are coupled by axle 48, and rear wheel 50, which is rotatably coupled to rear wheel strut 36. It will be appreciated that side wheels 44, 46, can be spaced apart at a distance corresponding to the common spacing of ridges in metal roof material so that side wheels 44, 46, can ride along the ridges in use to provide a guide for straight-line application. Although three wheels are depicted, it will be appreciated that four or more wheels could also be provided in some embodiments while remaining within the scope of the invention. For a non-limiting example, rear wheel 50 could be replaced by a pair of wheels spaced apart by the same distance as between side wheels 44, 46. In some embodiments, drive assembly 52 can be coupled to axle 48 to make cart assembly 22 self-propelled.

Rear wheel strut 36 is coupled to body plates 26, 28, with removable pins 58, 60, and handle member 38 is coupled to body plates 26, 28, with removable pins 62, 64, enabling rear wheel strut 36 and handle member 38 to be easily removed and reattached for transporting sprayer 20, and to enable sprayer 20 to be hoisted to a roof for use. Rear wheel strut 36 further includes detachable counterweight 66 to counterbalance the weight of sprayer support assembly 40.

Sprayer support assembly 40 generally includes axial member 68, lateral member 70, and vertical spray nozzle attachment members 72, 74, 76, 78. Attachment members 72, 74, 76, 78, are coupled to lateral member or boom 70 with clamps 80, which enable attachment members 72, 74, 76, 78, to be selectively vertically shifted relative to boom 70 and horizontally shifted along boom 70 as depicted by the arrows in FIG. 2, providing for width and height adjustability. Moreover, it will be appreciated that boom 70 could be made telescoping to provide width adjustability. Sprayer support assembly 40 is coupled to body plates 26, 28, with removable pins 82, 84, enabling sprayer support assembly 40 to be easily removed and reattached.

Figure 1:
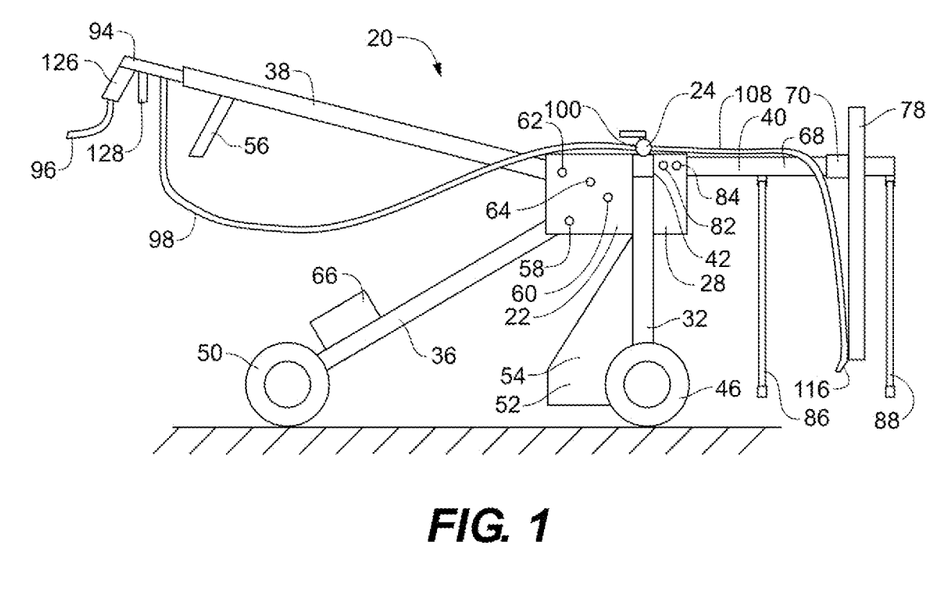
FIG. 1 is a right-side elevation view of a roof coating sprayer according to an embodiment of the invention.
Figure 2:
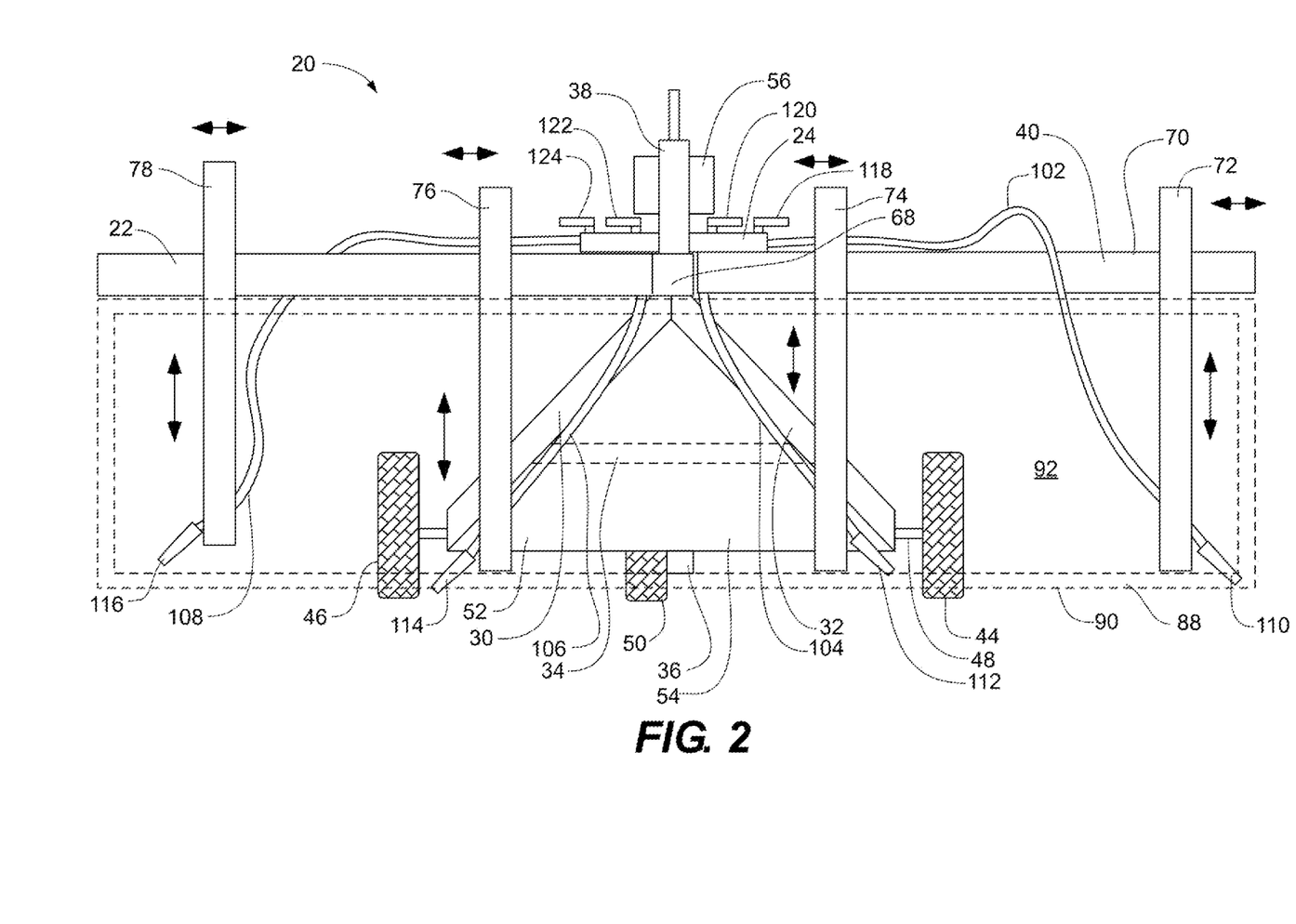
FIG. 2 is a front elevation view of the roof coating sprayer of FIG. 1, with an optional wind skirt depicted in phantom for clarity.
Figure 3:
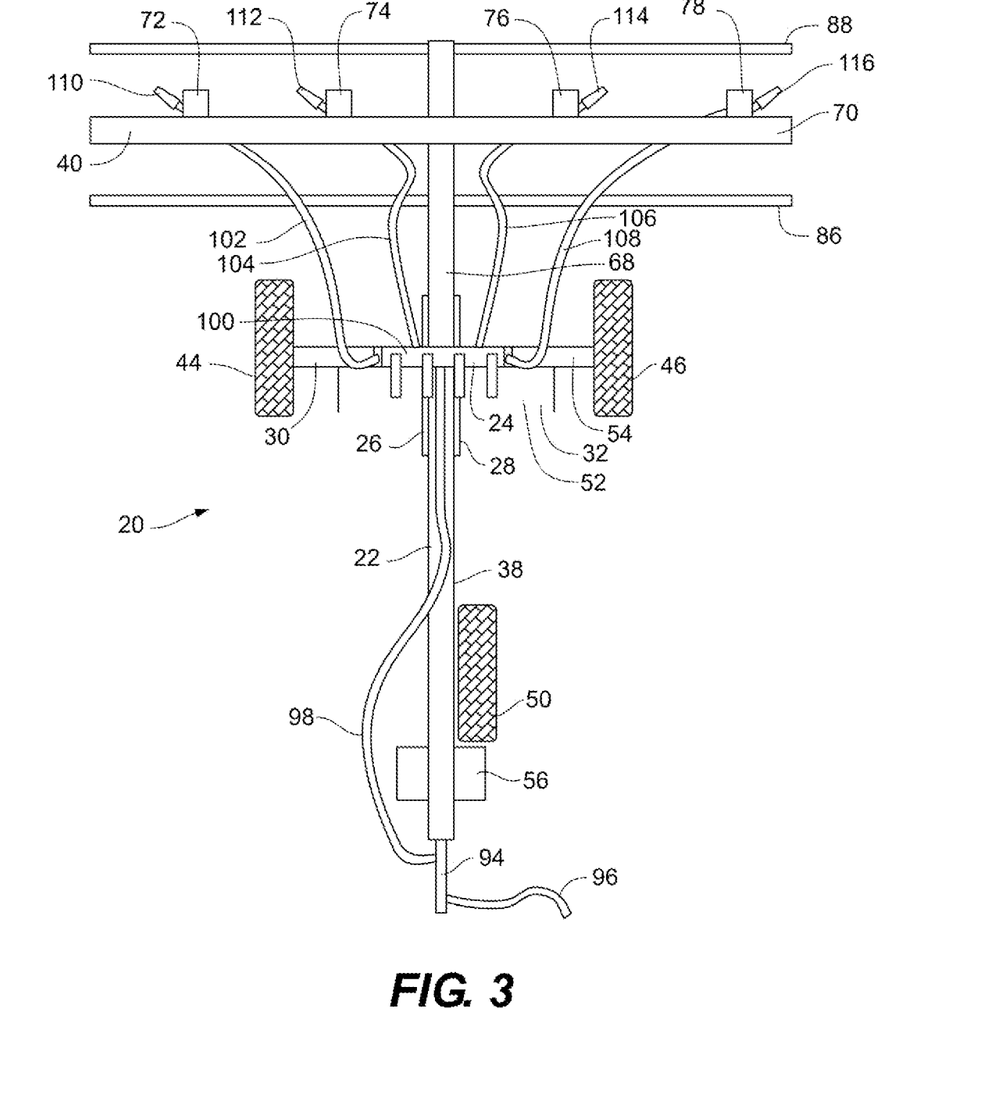
FIG. 3 is a top plan view of the roof coating sprayer of FIG. 1.

Sprayer support assembly 40 can include optional wind skirts 86, 88, to shield the sprayed area from wind, and control drift of spray. Each wind skirt 86, 88, can include a lightweight metal frame 90 coupled to axial member 68, and a cloth, rubber, or plastic shield 92 stretched over frame 90.

Figure 4:
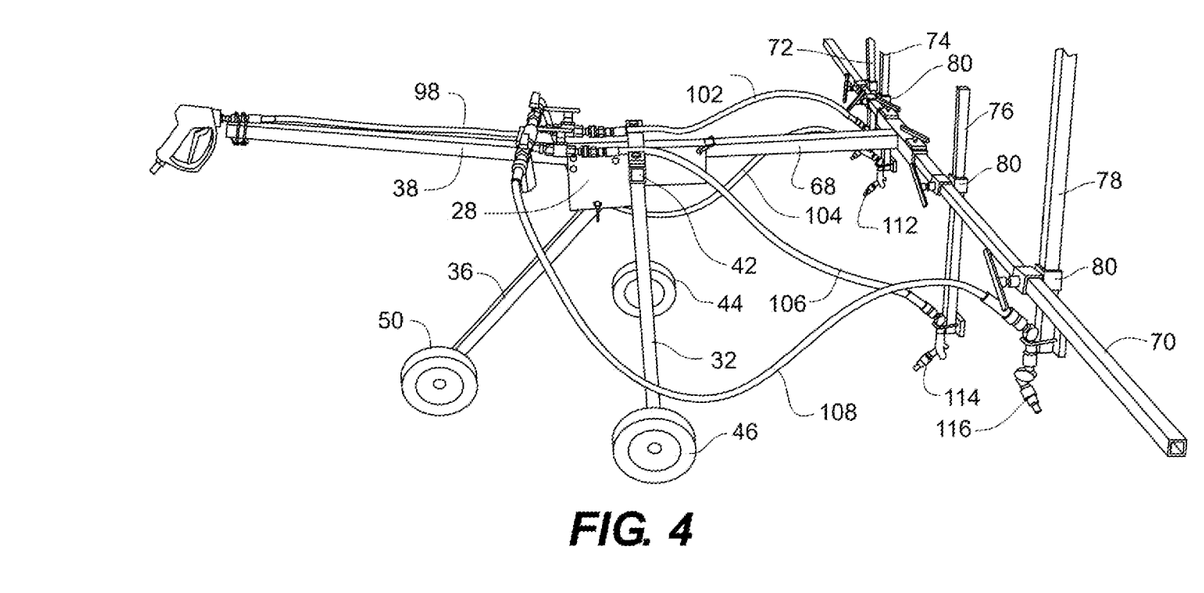
FIG. 4 is a perspective view of a roof coating sprayer according to an embodiment of the invention that does not incorporate a drive system.
Figure 5:
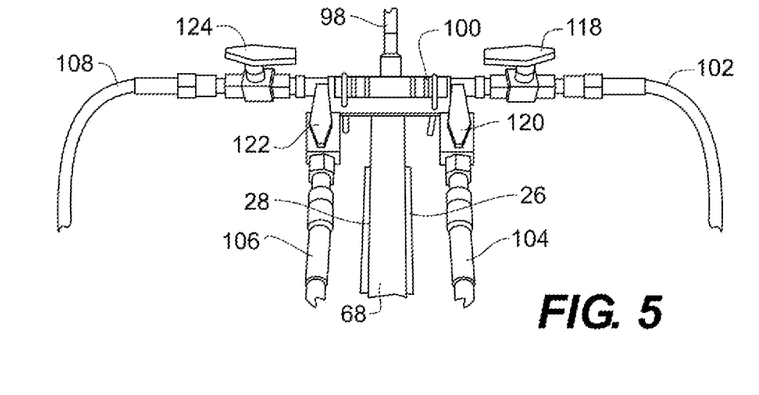
FIG. 5 is an isometric view of the valve manifold of the sprayer of FIG. 4.
Figure 6:
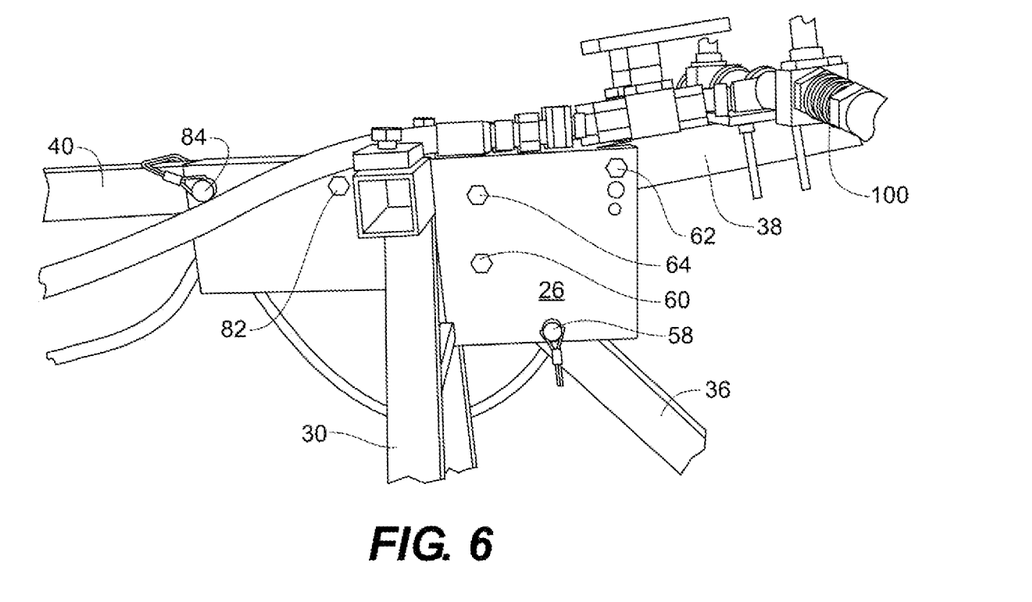
FIG. 6 is an isometric view of the body plates of the sprayer of FIG. 4.

Sprayer assembly 24 generally includes control handle 94, supply hose 96, feed hose 98, valve manifold 100, spray nozzle hoses 102, 104, 106, and 108, and spray nozzles 110, 112, 114, and 116. Each spray nozzle hose 102, 104, 106, and 108, is controlled by a separate valve 118, 120, 122, 124. Spray nozzles 110, 112, 114, 116, are rotatably attached to attachment members 72, 74, 76, 78, and can be rotated through 360° to direct spray in any desired direction. In addition, as described above, attachment members 72, 74, 76, 78, can be shifted vertically and horizontally to provide any desired spray pattern. Although depicted as manual valves, valves 118, 120, 122, 124, could be electric or pneumatic valves if desired. In addition, although four spray nozzles are depicted, any other number of spray nozzles can be provided while remaining within the scope of the invention.

Figure 7:
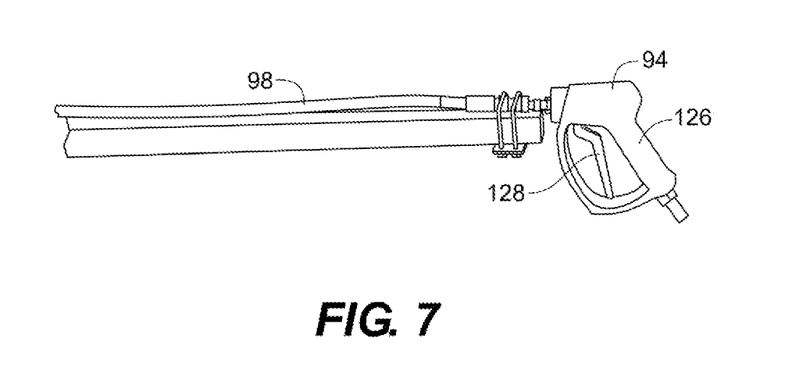
FIG. 7 is an isometric view of the control handle of the sprayer of FIG. 4.

Control handle 94 generally include grip portion 126 and trigger 128. Supply hose 96 connects with a pressurized source of spray fluid (not depicted) such as is commonly known to those skilled in the art, and feed hose 98 connects with valve manifold 100. Trigger 128 can be operated to enable liquid coating fluid to pass from supply hose 96 through feed hose 98 to valve manifold 100. Valves 118, 120, 122, 124, can be opened or closed to enable or prevent coating fluid from reaching nozzles 110, 112, 114, 116.

Figure 8:
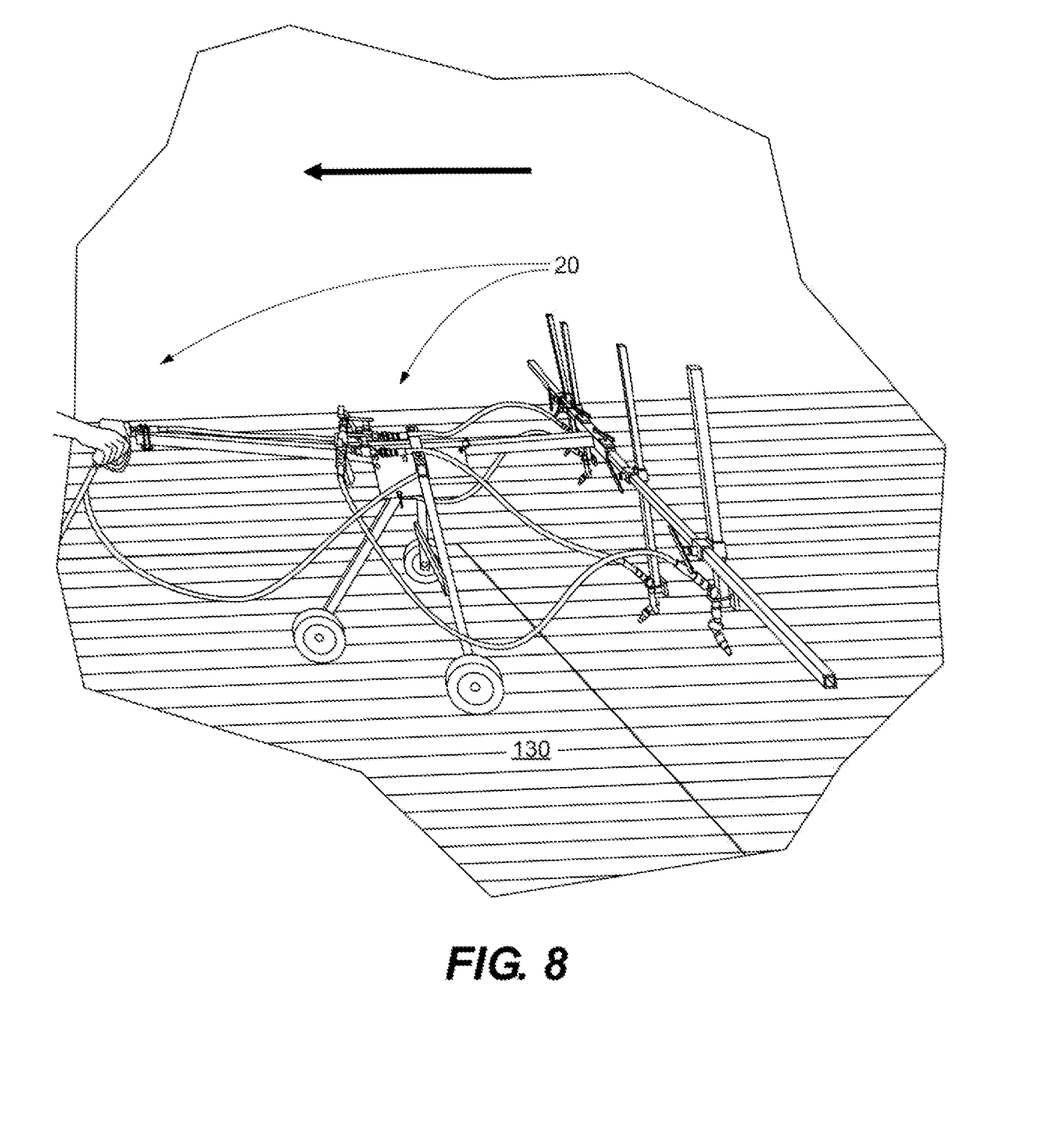
FIG. 8 is an isometric view of the sprayer of FIG. 4 in use.

In use, as depicted in FIG. 8, roof coating sprayer 20 can be positioned on roof 130. Supply hose 96 is attached to the pressurized source of coating liquid (not depicted). Valves 118, 120, 122, 124, are opened. Trigger 128 is operated to start the flow of coating liquid to nozzles 110, 112, 114, 116, and sprayer 20 is pulled at a steady rate in the direction of the arrow as depicted. Alternatively, in embodiments with drive assembly 52, the motorized drive can be engaged to drive sprayer 20 as indicated.

As depicted in FIGS. 9-12, drive assembly 52 generally includes housing 54, drive assembly 55, control circuitry 56, and transmission assembly 57. Drive assembly 55 generally includes gear motor 150 and motor mount 152. In a preferred embodiment, gear motor 150 is a 24 VDC variable speed gear motor such as is commonly known in the art, but it will be appreciated that any suitable electrically driven gear motor could be used while remaining within the scope of the invention. Motor mount 152 is secured to housing 54, and may be adjustable so that gear motor 150 can be selectively shifted relative to housing 54 to locate and position gear motor 150. Gear motor 150 is fixed to motor mount 152 with bolts 154.

Figure 9:
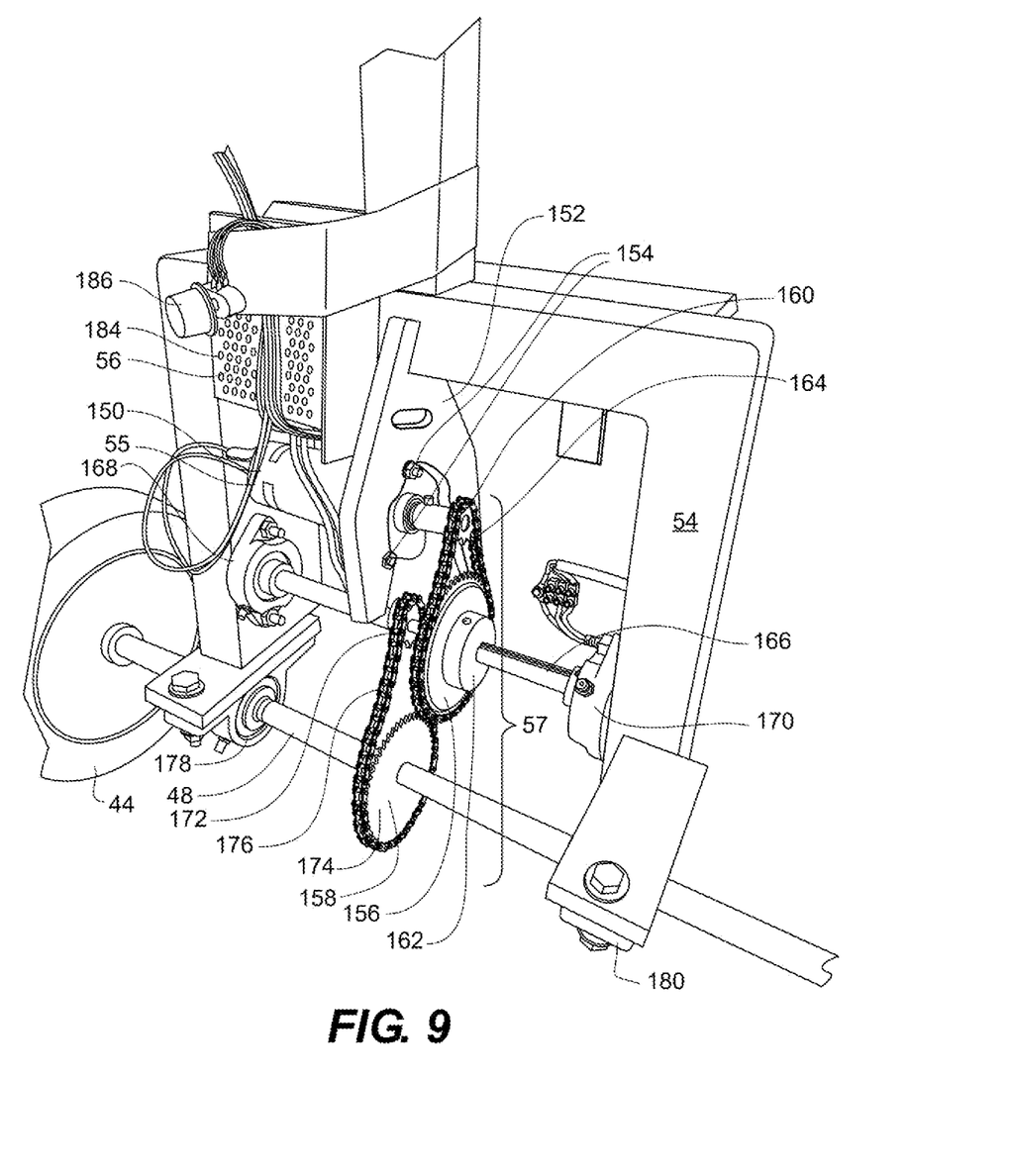
FIG. 9 is an isometric view of a drive assembly of a roof coating sprayer according to an embodiment of the invention.
Figure 10:
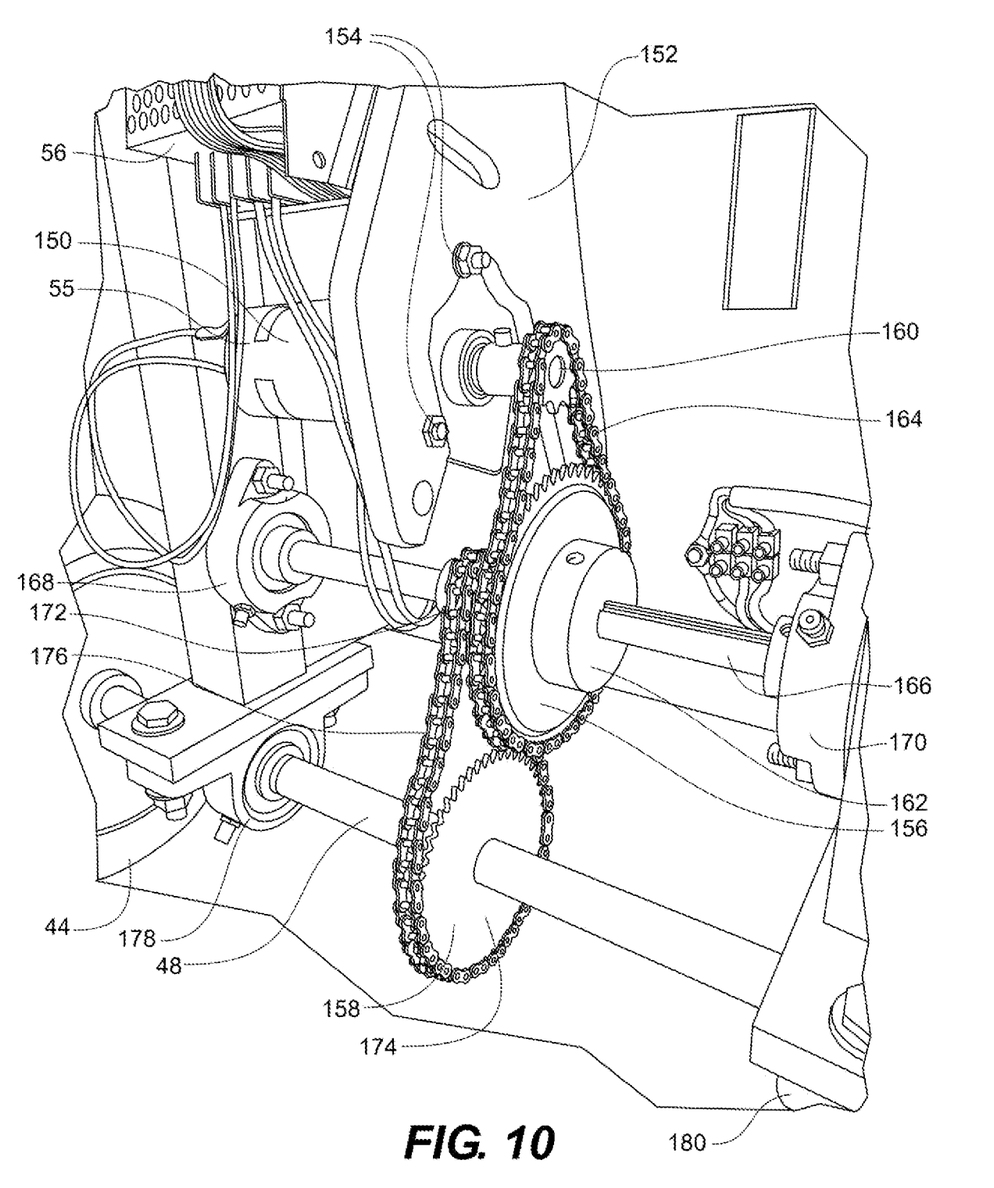
FIG. 10 is another isometric view of the drive assembly of FIG. 9.

Transmission assembly 57 generally includes first stage drive assembly 156 and second stage drive assembly 158. First stage drive assembly 156 generally includes drive sprocket 160 and driven sprocket 162 which are coupled by chain 164. Drive sprocket 160 is coupled with the output of gear motor 150, and driven sprocket 162 is fixed to intermediate shaft 166. Intermediate shaft 166 is rotatable in bearings 168, 170, which are coupled to housing 54. Second stage drive assembly 158 generally includes drive sprocket 172 and driven sprocket 174, which are coupled by chain 176. Drive sprocket 172 is fixed to intermediate shaft 166, and driven sprocket 174 is fixed to axle 48. Axle 48 rotates in pillow block bearings 178, 180.

Figure 11:
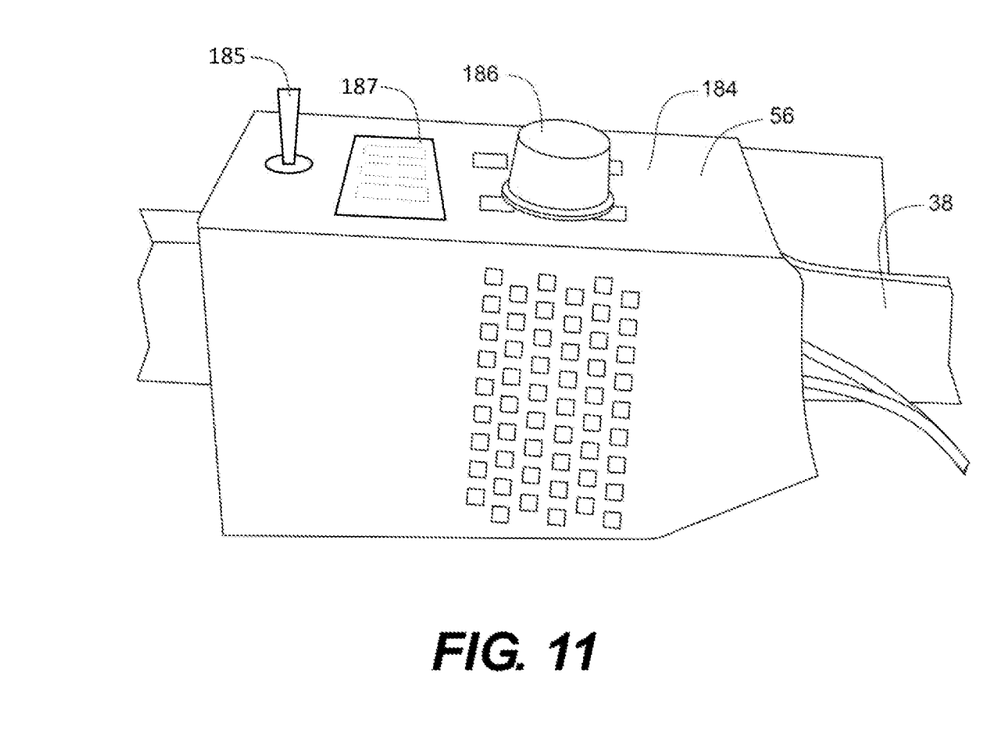
FIG. 11 is an isometric view of the motor speed controller of the embodiment of FIG. 9.
Figure 12:
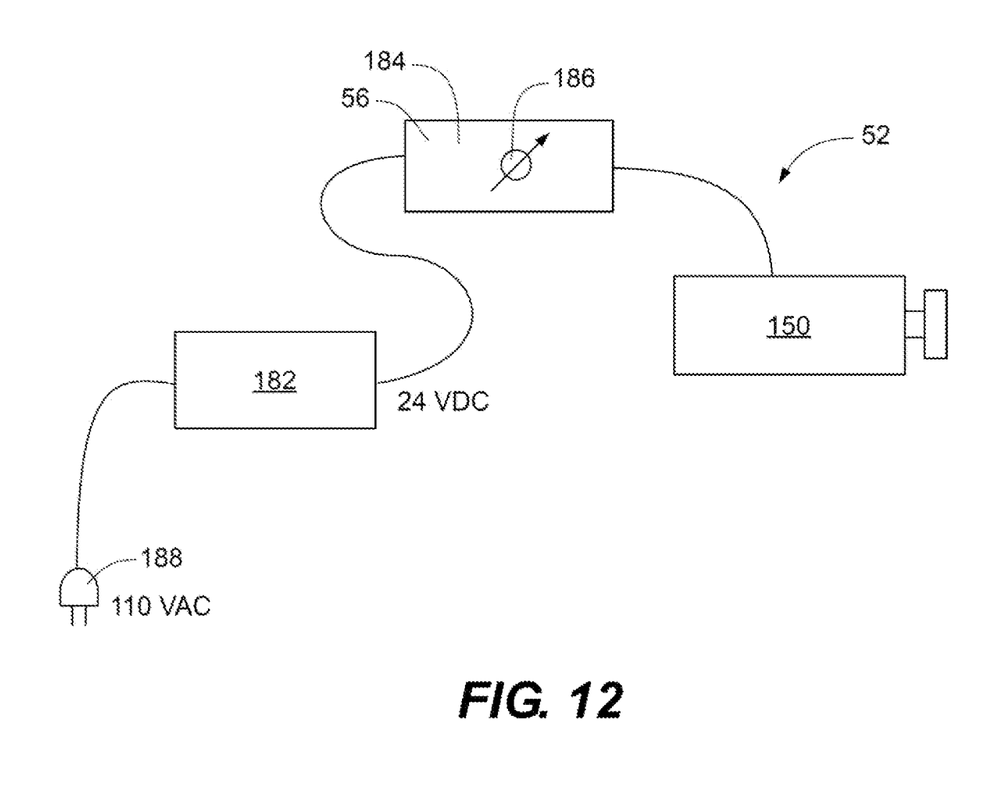
FIG. 12 is a high-level schematic of electrical details of the embodiment of FIG. 9.

FIG. 12 is a high-level schematic showing electrical details of drive assembly 52. In the depicted embodiment, 110 VAC mains power is supplied to power supply/rectifier 182, which provides an output of 24 VDC, which is then supplied to control circuitry 56, in the form of motor speed controller 184, and gear motor 150. Motor speed controller 184 can be any suitable gear motor speed control such as are commonly known in the art. As depicted in FIG. 11, motor speed controller 184 can include three-position switch 185, rotary speed control 186, and relative speed display 187. Three-position switch 185 can have an "off" position, a "forward" position, and a "reverse" position. Relative speed display 187 can be a numeric display having a suitable scale such as, for example, 0-100 to indicate the rotational speed of gear motor 150. Using rotary control 186, the rotational speed of gear motor 150, and the resultant moving speed of cart assembly 22, can be adjusted by an operator as desired. It will be appreciated that safety features such as circuit breakers (not depicted) may be incorporated into the circuit to prevent damage and failures due to overloading. Also, it will be appreciated that an operator safety tether (not depicted) can be connected to a switch (not depicted) to interrupt power to gear motor 150 if the operator loses control of roof coating sprayer 20 while being operated in self-propelled mode.

Again, with roof coating sprayer 20 positioned on roof 130, power cord 188 can be connected to a suitable source of 110 VAC power, and supply hose 96 attached to a pressurized source of coating liquid (not depicted). Three-position switch 185 can be moved from the "off" position to either the "forward" position, or the "reverse" position to start rotation of gear motor 150 and thereby initiate movement of sprayer 20 in the desired direction. The rotation of gear motor 150 is transmitted to axle 48 through transmission assembly 57, thereby causing wheels 44, 46, to rotate and roof coating sprayer 20 to move. The velocity of movement of roof coating sprayer 20 can be controlled by adjusting rotary control 186 to achieve the desired rate of progress. Valves 118, 120, 122, 124, can be opened, and trigger 128 operated to start the flow of coating liquid to nozzles 110, 112, 114, 116.

It will be appreciated by those skilled in the art that the drive can also be in a separate enclosure from the cart assembly or may be a separate unit towing the sprayer. Further, in any of the embodiments, power may be provided with a battery instead of a power cord connected to AC power.

In embodiments, advantages of the present invention can include providing up to a 60" spray width using four spray nozzles. Valves 118, 120, 122, 124, can be selectively closed to selectively decrease spray width, which may be useful for example, to avoid fixtures or projections on the roof. The adjustability of attachment members 72, 74, 76, 78, and nozzles 110, 112, 114, 116, enable tailoring of the spray pattern and thickness of coating as needed to accommodate different spray coating materials and roof configurations.

Roof coating sprayer 20 can provide a uniform consistent coating thickness over the entire roof surface, especially with the uniform rate of advance provided by drive assembly 52, and can enable the coating to be applied up to ten times faster than using a manual spray wand or roller.

It will be appreciated that roof coating sprayer 20 can also be used to apply coatings to large areas of concrete, for example parking lots, garages, and the like. Moreover, roof coating sprayer 20 may be used with water or other solvents for power washing surfaces.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A sprayer for applying a coating to a planar surface, the sprayer comprising:
   a frame;
   a plurality of wheels operably coupled to the frame;
   a drive assembly operably coupled to at least one of the plurality of wheels, the drive assembly comprising:
      a motor; and
      a transmission operably coupling the motor and the at least one of the plurality of wheels; and
   a sprayer assembly operably coupled to the frame, the sprayer assembly comprising:
      a supply hose adapted to couple with a pressurized supply of liquid coating material;
      a sprayer support assembly including a boom and a plurality of vertical spray nozzle attachment members operably coupled to the boom, each one of the plurality of vertical spray nozzle attachment members being selectively separately horizontally and vertically shiftable relative to the boom;
      a plurality of spray nozzles adapted to spray the liquid coating material on the planar surface, each one of the plurality of spray nozzles being operably coupled to a separate one of the vertical spray nozzle attachment members;
      a manifold coupled with the supply hose; and
      a plurality of spray nozzle hoses fluidly coupled with the manifold, each of the plurality of spray nozzle hoses fluidly coupled with a separate one of the plurality of spray nozzles to deliver the liquid coating material to the respective separate one of the plurality of spray nozzles.

2. The sprayer of claim 1, wherein the drive motor of the drive assembly is a direct current electric motor.

3. The sprayer of claim 1, wherein the transmission includes a drive sprocket coupled with an output shaft of the motor and a driven sprocket coupled with an axle, the axle being coupled with the at least one of the plurality of wheels, the drive sprocket and the driven sprocket being coupled by a chain.

4. The sprayer of claim 1, wherein the transmission includes a drive sprocket coupled with an output shaft of the motor, a driven sprocket coupled with an intermediate shaft having a secondary drive sprocket, and an axle having a secondary driven sprocket coupled with the at least one of the plurality of wheels, the drive sprocket of the output shaft of the motor and the driven sprocket of the intermediate shaft being coupled by a first chain, and the secondary drive sprocket and the driven sprocket of the axle being coupled by a second chain.

5. The sprayer of claim 1, wherein the drive assembly further comprises a motor controller.

6. The sprayer of claim 5, wherein the motor controller includes a switch electrically coupled to enable selection of a direction of rotation for the motor.

7. The sprayer of claim 5, wherein the motor controller includes a speed selection control enabling a user to adjust a rotation speed of the motor.

8. The sprayer of claim 7, wherein the motor controller includes a display enabling a user to view the relative rotation speed of the motor.

9. The sprayer of claim 1, wherein the manifold includes a plurality of operable valves, each of the operable valves coupled to a separate one of the plurality of spray nozzle hoses and arranged so as to control the flow of liquid coating material to the respective one of the plurality of spray nozzle hoses.

10. The sprayer of claim 1, wherein the sprayer support assembly includes a wind skirt.

* * * * *